United States Patent
Kou et al.

[11] Patent Number: 6,154,225
[45] Date of Patent: *Nov. 28, 2000

[54] VIRTUAL REFRESH™ ARCHITECTURE FOR A VIDEO-GRAPHICS CONTROLLER

[75] Inventors: Wallace C. Kou, Los Altos; Mark Y. Wong, Union City, both of Calif.

[73] Assignee: Silicon Motion, Inc., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/731,360

[22] Filed: Oct. 11, 1996

[51] Int. Cl.$^7$ ........................................................ G06F 15/76
[52] U.S. Cl. .............................. 345/519; 345/502; 345/1; 345/3; 345/213; 345/153
[58] Field of Search .............................. 345/1, 3, 87, 92, 345/213, 502, 519, 507, 509, 153–155

[56] References Cited

U.S. PATENT DOCUMENTS

| | | | |
|---|---|---|---|
| 4,393,394 | 7/1983 | McCoy | 358/22 |
| 5,218,274 | 6/1993 | Zenda | 345/3 |
| 5,473,342 | 12/1995 | Tse et al. | 345/132 |
| 5,488,385 | 1/1996 | Singhal et al. | 345/3 |
| 5,510,843 | 4/1996 | Keene et al. | 348/446 |
| 5,694,141 | 12/1997 | Chee | 345/3 |

OTHER PUBLICATIONS

"86CM65 Aurora 64Vt Dual Display Accelerator for Notebook Computers" Feature List (Printed From S3's Home Page), Jun. 1, 1998.

Product Data Book, 86CM65 Aurora64V+ Dual Display Accelerator, Section 11: Flat Panel Interface, S3 Incorporated, Santa Clara, California (Jul. 1996) pp. 1–14.

Primary Examiner—Kee M. Tung
Attorney, Agent, or Firm—Blakely, Sokoloff, Taylor & Zafman

[57] ABSTRACT

A single-chip video-graphics controller displays a color image stored in an external display memory simultaneously on two devices having different refresh and display requirements. The controller includes a first display processor which fetches the color image from the external memory and displays the image on a first device, such as a color CRT monitor or TV. The controller reduces the bandwidth of the fetched color image on-the-fly and stores a copy of the reduced bandwidth image in another part of the external display memory. A second display processor fetches the reduced bandwidth copy at a rate compatible with a second display device, such as a DSTN flat-panel device using dithering for color depth enhancement. The two display processes are independent of each other, controlled only by the refresh requirements of the two display devices. In a specific embodiment of the invention, the controller includes a clock control circuit which alternatively slows or stops clock signals which operate the first display processor and the bandwidth reduction function when the first display device is shut off and when the color image is not changing over time. The controller can be programmed to access two buffer areas of the external display memory permitting different images to be displayed on the two display devices. This feature is useful in presentations when a TV projector displays material for an audience and a flat-panel is used to display a speaker's notes.

25 Claims, 6 Drawing Sheets

VIRTUAL REFRESH™ ARCHITECTURE FOR A VIDEO-GRAPHICS CONTROLLER

BACKGROUND

1. Field of the Invention

The invention relates to video-graphics controllers and in particular to a single-chip controller for the simultaneous display of color image data on two display devices having inconsistent refresh requirements, such as interlaced TV and color DSTN LCD.

2. Background of the Invention

Portable computers (e.g., laptops, notebooks, etc.) are becoming more powerful and are currently being used for multimedia video-graphics presentations in which a color image is displayed simultaneously on a CRT monitor or color television receiver, such as an NTSC projector, and on the computer's own flat-panel color display. During a presentation, it is common for the CRT or TV to display color images while the portable's flat-panel display is used to display the speaker's notes or presentation outline.

At the present time, no single-chip video-graphics controller can handle such diverse display needs because the refresh rates for the CRT/TV and for the flat-panel display are not compatible. A current solution to the problem is to use two different controllers, each specialized for the particular display device it must control. Such an arrangement is both expensive and power consuming since both controllers operate all the time.

What is needed is a controller architecture which incorporates both display functions into a single chip, and which accommodates a wide variety of display types by appropriate internal programming while aggressively conserving operating power.

SUMMARY OF THE INVENTION

In a preferred embodiment of the present invention, a single-chip video-graphics controller displays a color image stored in an external display memory on two devices simultaneously, each device having entirely different display and refresh requirements. In its simplest form, the controller includes a first display processor which fetches the color image from the external memory and displays the image on a first display device, such as a color CRT monitor or TV. The controller reduces the bandwidth of the fetched color image on-the-fly and stores a copy of the reduced bandwidth image in another part of the external display memory. The controller includes a second display processor which fetches the reduced bandwidth copy at a rate compatible with a second display device, such as a DSTN flat-panel device using dithering for color depth enhancement or a TFT LCD device.

Though embodied within a single chip and sharing a common external display memory, the two display processors are otherwise independent of each other, and each provides outputs compatible with, and at a refresh rate meeting the specific requirements for its own display device.

In another embodiment of the invention, the single-chip controller includes clock control circuits used alternatively to slow or stop the frequency of clock signals used to operate the first display processor and the bandwidth reduction function. The controlled clock frequency is altered when no first display device is connected, and when the color image is not changing over time.

The controller is also programmable to permit images to be accessed and displayed from two separate areas of the external display memory. This ability permits one display to be used for a presentation while the other display is used for a speaker's notes.

BRIEF DESCRIPTION OF THE DRAWINGS

For a further understanding of the objects, features and advantages of the present invention, reference should be had to the following description of the preferred embodiment, taken in conjunction with the accompanying drawing, in which like parts are given like reference numerals and wherein.

DESCRIPTION OF THE PREFERRED EMBODIMENT

Figure 1:
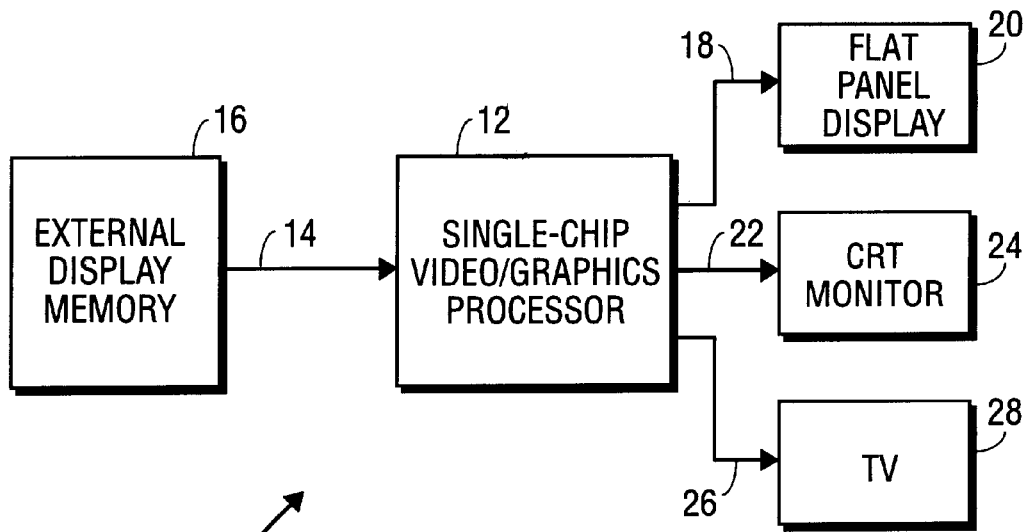
FIG. 1 is a block diagram of a single-chip video-graphics controller used in a multimedia display system.

With respect to FIG. 1 there is shown a multimedia display system designated generally by the numeral 10. The multimedia display system 10 includes a single-chip video-graphics controller 12, communicating via an address and data bus 14 with an external display memory 16. The multimedia display system 10 also includes output lines 18 connecting the video-graphics controller 12 to a flat panel display 20, output lines 22 connecting to a CRT monitor 24, and output lines 26 connecting to a standard television receiver 28. The multimedia display system 10 is the context within which the present invention is practiced. As will become clear below, a preferred embodiment of the invention is directed to the internal architecture of the single-chip video-graphics controller 12.

A few definitions are appropriate before proceeding. Signals are referred to both by signal name, by function and by the line(s) or wire(s) that carry the signals, as is a common practice in the electronics industry. A distinction between any of these styles will be made when necessary to make the meaning clear. The expression "on-the-fly" is used at several places in this Specification. The expression refers to a stream of color pixels which is fetched from memory in portions, and to a process operating on the individual pixels of the stream in a sequential order. Such processing is said to be done "on-the-fly" because the entire stream is not present at any time except in memory. The expression "FIFO" is used repeatedly throughout this Specification. A FIFO is a dynamic data storage device which receives items and then releases them in the order in which they were received. A FIFO is used to fetch a stream of color pixels a portion at a time. The FIFO is used to smooth the delivery of the stream which is usually obtained rapidly in short portions at infrequent intervals and then released smoothly to some using process, the number of items in the FIFO increases and decreases as required to maintain the smooth delivery. The letters stand for "first in, first out."

Simultaneous Display: Inconsistent Refresh Rates and Types

The phrase Virtual Refresh™ is a trademark of the assignee of the present invention. In general the phrase refers to a novel architecture simplifying the display of a color image simultaneously on two display devices having different display process requirements and screen refresh rates—a task formerly possible only using separate controllers. In addition, the Virtual Refresh™ architecture reduces congestion on the shared display memory address and data bus, thereby maintaining high image quality. Finally, the architecture permits a selective slowing or shutting down of unused portions of the controller, offering a significant reduction in operating power under typical circumstances.

Figure 2:
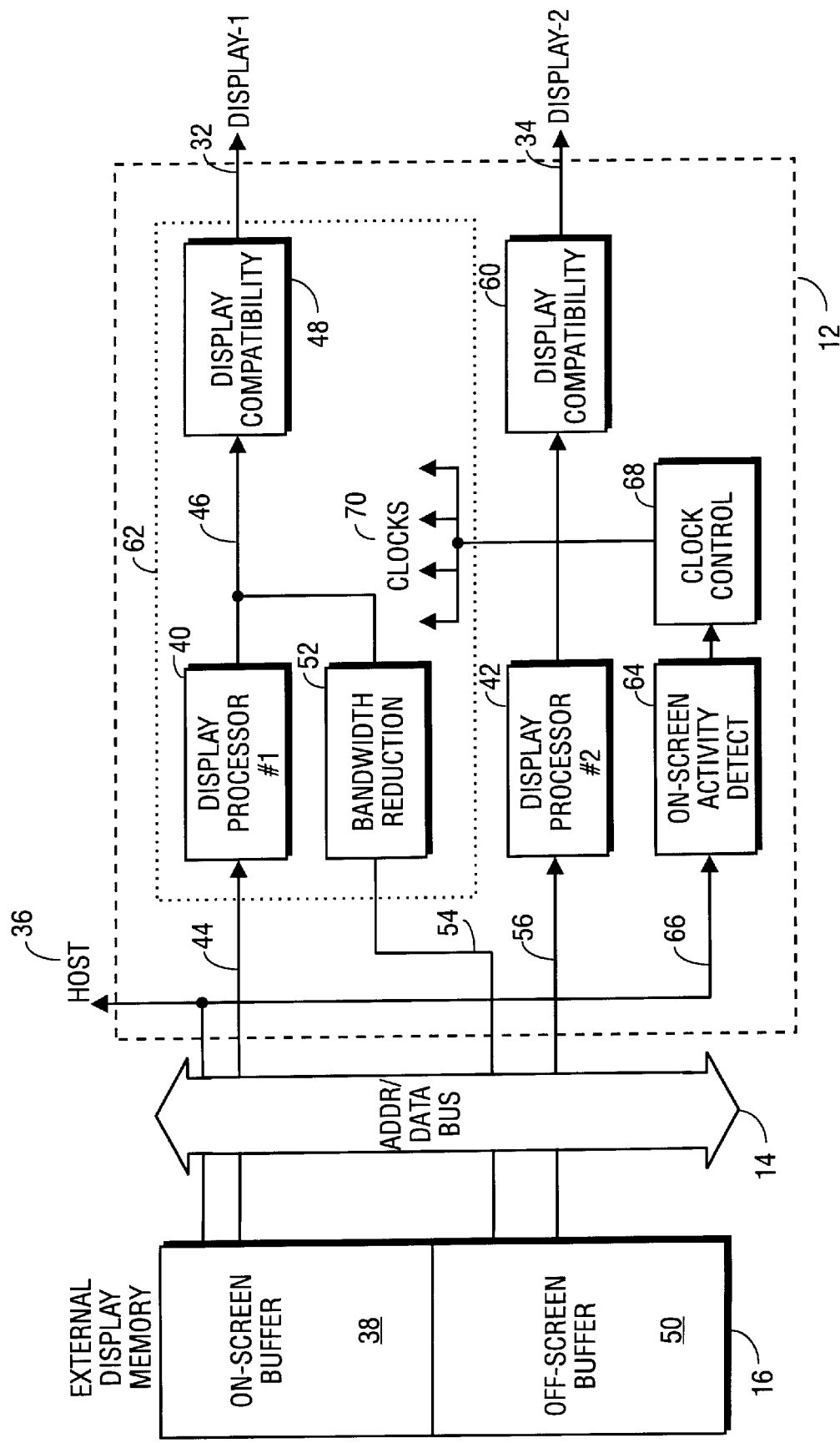
FIG. 2 is a simplified block diagram illustrating a single-chip video-graphics controller as shown in FIG. 1.

The novel Virtual Refresh™ architecture is illustrated in a simplified block diagram form in FIG. 2, which shows a portion of the multimedia display system 10. The illustrated portion is designated generally by the numeral 30 and includes the single-chip video-graphics controller 12, the shared address and data bus 14, the external display memory 16, and has output lines 32 and 34 for connection to first and second display devices.

In general a host 36, such as a microprocessor, places color pixel data representing a display image into an on-screen buffer portion 38 of the external display memory 16. A first display processor 40 accesses the color pixel data from the on-screen buffer 38 for display on the first display device, while a second display processor 42 simultaneously accesses data from the external display memory 16 for display on the second display device of a different type and having different display and refresh requirements.

The host 36 and the first and the second display processors 40, 42 share the common address and data bus 14 for access to the external display memory 16. The rate at which the host 36 accesses the external display memory 16 is determined by the rate at which the display image changes over time— the more rapidly the image changes, the more frequent the host memory accesses, and vice versa. The first and the second display processors 40, 42 access the external display memory 16 at different rates. These access rates depend upon the individual display and refresh needs of the particular display devices being used, and in general are completely independent of each other.

The three processes—the host 36, the first and the second display processors 40, 42—compete for use of the common address and data bus 14. If care is not taken in the design of the video-graphics controller 12, the available bandwidth of the shared address and data bus 14 becomes a limiting factor in the overall system performance. The quality of the displayed images is directly related to the available bus bandwidth. When it is not possible to make the necessary memory accesses during an interval of time, the display image quality suffers.

With that introduction, it is seen with respect to FIG. 2 that the first display processor 40 accesses data from the on-screen buffer 38 via lines 44 and the shared address and data bus 14. The first display processor 40 converts the accessed data, if necessary, to a 24-bit direct-color-mode format—8 bits Red, 8 bits Green, and 8 bits Blue—and presents the converted data 46 to a display compatibility circuit 48 which creates the output signals 32 needed by a particular first display device. Examples of a first display device are a color CRT monitor and a color NTSC or PAL television receiver.

The process of accessing the color pixel data from the on-screen buffer 38 by the first display processor 40 occurs at a rate determined by the display and refresh needs of a specific first display device. This access process is concurrent with the host 36 accesses needed to update the information in the on-screen buffer 38 as the display image changes over time.

Depending upon the refresh needs of a particular display device and the rate at which the display image is changing over time, the host 36 and the first display processor 40 will make frequent use of the shared address and data bus 14. The display image quality will become degraded to some extent if either the host 36 or the first display processor 40 is unable to access the on-screen buffer 38 as frequently as required.

The problem is exacerbated considerably when a flat panel display device such as a color DSTN LCD device (or in some cases, a TFT device, when dithering is being used with certain color modes) is connected for simultaneous display of the same color pixel data. The DSTN devices use a standard "dithering" technique for color-depth enhancement. The dithering technique is a form of time modulation of the image data and requires many additional memory accesses to provide the rich color depth commonly associated with a high quality flat panel display.

These additional accesses are handled by the second display processor 42 using the same address and data bus 14 used by the host 36 and the first display processor 40. The rate at which the second display processor 42 accesses the color pixel data is likewise determined by the display and refresh needs of the particular display device to which it is connected, but is generally completely independent of the refresh rate of the first display process. And when dithering is used to enhance color depth, the second display processor 42 must operate at a much higher frame rate than the rate required by the first display processor 40 for a color CRT monitor or a television receiver.

When the data in the on-screen buffer 38 is coded in one of the direct-color modes, it is theoretically possible for the first and second display processors 40, 42 to fetch the color data from the on-screen buffer 38 at rates determined by the needs of their respective display devices, process the data, and display it as a color image on each display device. But when the data in the on-screen buffer 38 is coded in an indexed-color mode, it is first necessary to convert that indexed-color mode data to a direct-color mode before display on any device. In a worst case, such as when the first device is an interlaced TV and the second device is a color DSTN flat-panel using fall dithering for color depth enhancement, that would mean that each display processor 40, 42 will fetch the data from the on-screen buffer 38 at its own rate, independently convert the fetched data from the indexed-color mode to a direct-color mode and output the data to its respective device.

To date, no one has been able to solve that problem because of the limitations of the bandwidth of the shared address and data bus 14 used to access the external display memory 16. The Virtual Refresh™ architecture offers a solution to this problem by taking a copy of the direct-color mode data after it has been converted from indexed-mode data by the first display processor 40, reducing the bandwidth of this direct-color mode data, and writing a copy back to an off-screen buffer portion 50 of the external display memory 16. Now the second display processor 42 fetches this reduced bandwidth copy at a rate compatible with the needs of its own display device and without using so much of the bandwidth of the shared address and data bus 14. The Virtual Refresh™ architecture permits interlaced TV and fully dithered color DSTN to be handled by a single-chip controller. That is a non-obvious advantage of the present invention.

When the color pixel data placed in the on-screen buffer 38 is coded in an indexed-color mode, i.e., 256 colors having 8 bits per pixel, the color data must be converted into a direct-color-mode before it is displayed, i.e., 24 bits per pixel—8 bits Red, 8 bits Green, and 8 bits Blue. When the first display device is a CRT or a TV, and the second display device is a flat panel display using dithering, the refresh rates of the two display devices are significantly different from one another. Both of these devices are unable to directly display the indexed-color mode data in the on-screen buffer 38. Therefore it is customary to make a copy of the converted direct-color-mode 24-bit data 46 for use by the second display device, and to place the copy into an off-screen buffer portion 50 of the external display memory 16. The second display processor 42 accesses the direct-color-mode data in the off-screen buffer 50 at a rate determined solely by the refresh needs and the color depth enhancement "dithering" needs of a flat-panel display device.

In a modem multimedia display system 10 such as illustrated in FIG. 1, display quality suffers if the copy of the on-screen color pixel data retained in the off-screen buffer 50 is stored as full 24-bit direct-color-mode data. That is because the need to write the 24-bit color pixel data into the off-screen buffer 50, and then to fetch the same 24-bit color pixel data for display on the flat panel device requires excessive bandwidth of the address and data bus 14. This shortcoming is particularly noticed when color depth enhancing "dithering" is employed because it significantly increases the number of accesses made to the off-screen buffer data during any period of time.

As mentioned above, in the present invention this problem is overcome in a novel way by reducing the bandwidth of the direct-color-mode color pixel data 46 before it is stored into the off-screen buffer 50. The reduction in bandwidth is enough to permit all the competing accesses via the common address and data bus 14 to occur without a noticeable degradation of display image quality.

As further shown in FIG. 2, a bandwidth reduction circuit 52 receives the 24-bit direct-color-mode data 46 provided by the first display processor 40 and converts that 24-bit color pixel data to 8-bit or, alternatively, to 16-bit color pixel data. This reduced bandwidth data is then stored into the off-screen buffer 50 via lines 54. The reduced bandwidth data is fetched via lines 56 from the off-screen buffer 50 by the second display processor 42 for display on a flat-panel device. The output 58 of the second display processor 42 is presented to a second display compatibility circuit 60 which provides the output signals 34 required by the specific second display device.

Power Reduction Feature

Another major aspect of the present invention is also illustrated in FIG. 2. The feature permits the operating frequency of the first display processor 40 and the bandwidth reduction circuit 52 to be reduced under programmable control, or to be stopped altogether when the display image in the on-screen buffer 38 does not change within a prescribed interval of time. This feature is useful when no first display device is connected, as is frequently the case in laptop and subnotebook computers. These computers are equipped with DSTN and TFT LCD display devices which typically are the only active display devices when the computer is being operated from battery.

The speed control is achieved by controlling the clock signals used by the portion 62. Since the invention is made using CMOS circuits, slowing or stopping the clock will save power. In one embodiment of the invention, approximately 70% of the circuits in the single chip video-graphics controller 12 are located within the controlled portion 62. Therefore, use of this feature can have a major effect on power reduction, and when used in portable computers, can significantly prolong the operational time available from a fully charged battery.

The single-chip video-graphics controller 12 is shown enclosed (FIG. 2) with a broken line. An inner portion 62 of the video-graphics controller 12 is shown enclosed by a second broken line. The portion 62 includes the first display processor 40, the first display compatibility circuits 48 and the bandwidth reduction circuit 52. An on-screen activity detector 64 is shown outside the portion 62. The activity detector 64 monitors the host 36 external display memory 16 accesses via a line 66. If the host 36 does not access the memory 16 within a predetermined interval, the activity detector 64 activates a clock control circuit 68 which alternatively reduces the frequency of or stops altogether clock signals 70 used to operate the circuits within the controlled portion 62. When the host 36 again accesses the memory 16, the activity detector 64 commands the clock control circuit 68 to resume a normal frequency for the clock signals 70, and the circuits within the controlled portion 62 resume normal operation.

In another aspect of the invention, the clock control circuit 68 is programmable, permitting the frequency of the clock signals 70 to be reduced significantly or, alternatively, stopped altogether when the second display device is being used alone. In a typical situation, the frequency of the clock signals 70 is reduced from approximately 50 MHz to approximately 5 MHz, resulting in a significant reduction in operating power.

Display Memory Access

Figure 3:
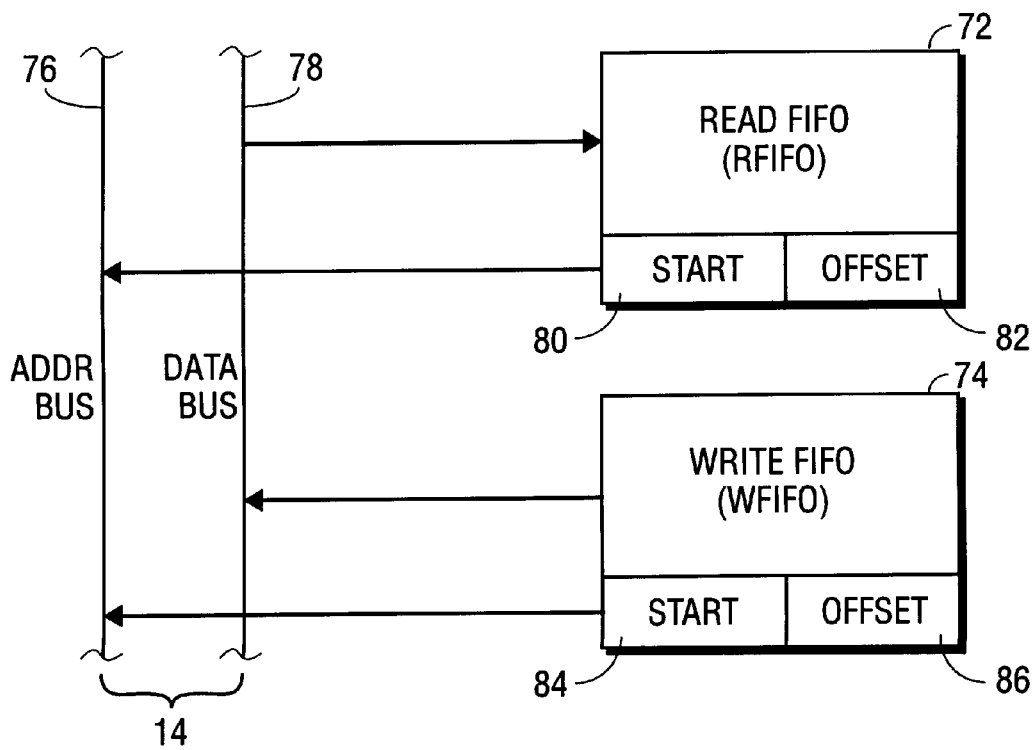
FIG. 3 is a partial block diagram showing typical read and write FIFO's connected to a shared bus for accessing the external display memory shown in FIG. 1.

FIG. 3 is a partial block diagram illustrating the shared address and data bus 14 connected to a representative read FIFO 72 and write FIFO 74 for accessing the external display memory 16. The address and data bus 14 includes an address bus portion 76 and a data bus portion 78 shown here separately for a discussion of the typical read and write FIFO's 72, 74.

Though the detail is hidden in the simplified block diagram of FIG. 2, in a preferred embodiment of the present invention, the various paths between the single-chip video-graphics controller 12 and the external display memory 16 employ a shared memory controller (not shown) which mediates between the bus 14 and the individual processes using the bus, including the host 36, as described above. Each process gains access to the shared memory controller via a separate read or write FIFO, such as those shown in FIG. 3.

The particular arrangement of elements by which a FIFO indirectly gains access to the external display memory 16 gives the Virtual Refresh™ architecture much of its flexibility and power. This power is a direct result of each FIFO's having its own start address register 80, 84 and offset register 82, 86. The initial contents of these registers are programmable to permit a FIFO to read or to write a block of data starting at any storage location within the external display memory 16. In a preferred embodiment, the capacity of the external display memory 16 is 2 MB and the width of each storage location is 64 bits. In a specific embodiment of the video-graphics controller 12, the read and the write FIFO's are 64 bits to match the width of the data bus portion of the shared address and data bus 14 and each storage location of the external display memory 16. In another specific embodiment, each read and each write FIFO is 32 64-bit words deep. The size of the FIFO's is selected to permit the concurrent operation of several independent processes, including but not limited to the accesses by the host 36 and the first and second display processors 40, 42 of FIG. 2.

Figure 4:
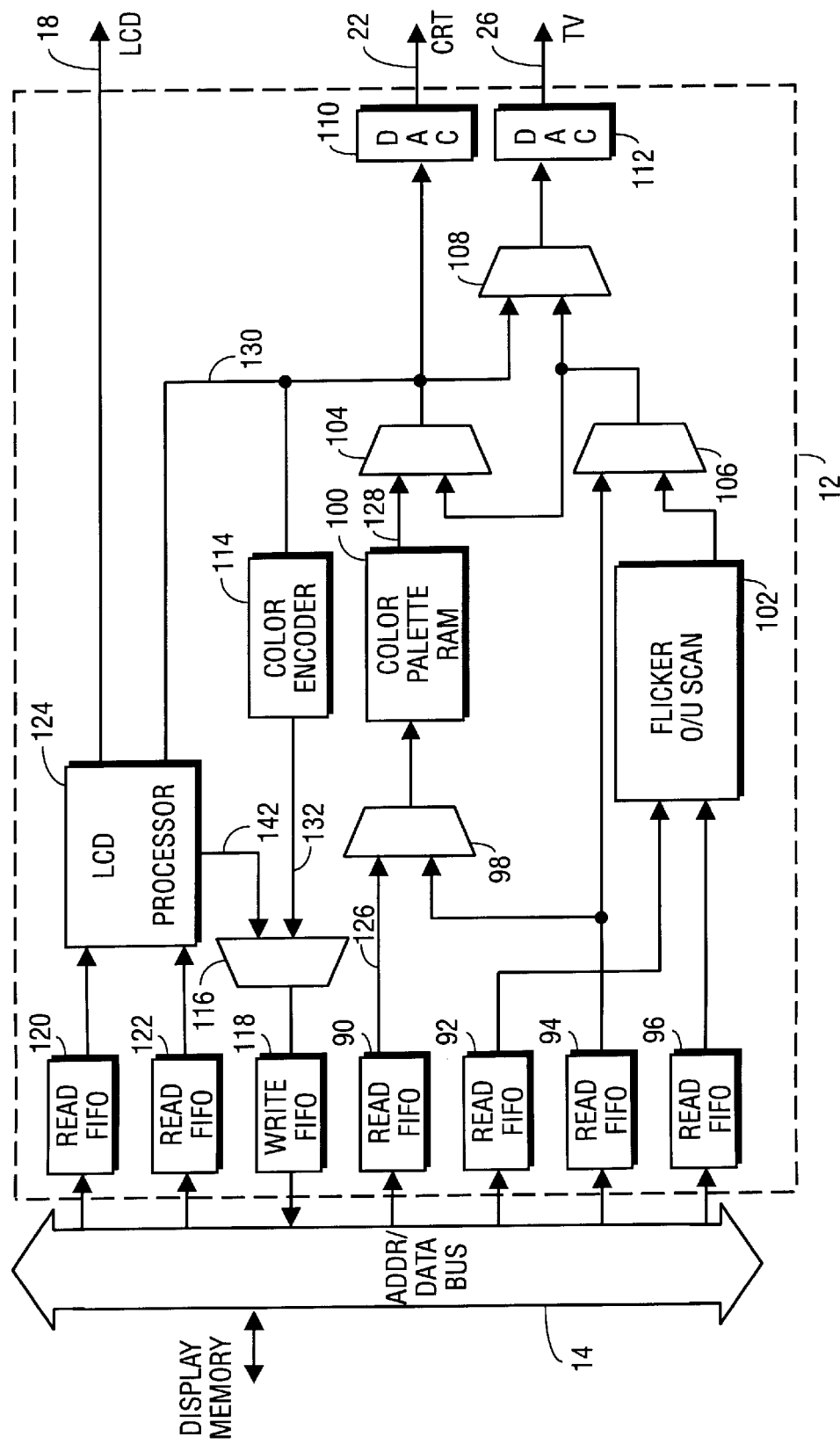
FIG. 4 is a block diagram which illustrates a specific embodiment of the single-chip video-graphics controller of FIG. 2.

A specific embodiment of the video-graphics controller 12 incorporating the Virtual Refresh™ architecture is shown in the block diagram of FIG. 4. The block diagram also includes the address and data bus 14 and the output lines 18, 22 and 26, as illustrated in FIG. 1. FIG. 4 focuses attention on the information flow from the external display memory 16 (not shown), through the video-graphics controller 12, to the output lines 18, 22, 26. Therefore the path between the host 36 and the on-screen buffer 38, and the on-screen activity detector 64 and clock control circuit 68, all of FIG. 2, are not shown in this view.

To understand the full power of the Virtual Refresh™ architecture, it is useful to relate parts shown in FIG. 2 with corresponding parts shown in FIG. 4. The first display processor 40 and the first display compatibility circuit 48 of FIG. 2 correspond to a combination of the following parts of FIG. 4: read FIFO's 90, 92, 94 and 96; a multiplexer 98; a color-palette RAM 100; a flicker reduction and over/underscan circuit 102; multiplexers 104, 106 and 108; digital-to-analog converters 110 and 112; and output lines 22 and 26. The bandwidth reduction circuit 52 of FIG. 2 corresponds to a combination of a color encoder 114, a multiplexer 116 and a write FIFO 118, all of FIG. 4. The second display processor 42 and the second display compatibility circuit 60 of FIG. 2 correspond to a combination of read FIFO's 120 and 122, an LCD processor 124, and the output line 18, all of FIG. 4.

The manner in which the parts illustrated in FIG. 4 cooperate to permit the simultaneous display of color data using previously incompatible devices is best understood by several examples.

EXAMPLE 1

Indexed-Color Mode to CRT Monitor and to TFT LCD

In the first example of the operation of video-graphics controller 12 of FIG. 4, we assume that the host 36 (FIG. 2) is periodically updating indexed-color mode pixel data in the on-screen buffer 38 (FIG. 2). This pixel data defines a color image which changes over time.

The read FIFO 90 is programmed to access the on-screen buffer 38. The result is a stream of indexed-color mode pixels, 8 bits per pixel, arriving on line 126 then through the multiplexer 98 and into the color-palette RAM 100. The purpose of a color-palette RAM is well understood in the art and it converts each 8-bit pixel of the arriving stream to a 24-bit direct-color mode pixel. The output of the color-palette RAM 100 appears on line 128 as a stream of direct-color mode 24-bit pixels corresponding to the image stored in the on-screen buffer 38. These direct-color mode pixels pass through the multiplexer 104 then via line 130 into three 8-bit digital-to-analog converters represented by the single numeral 110. The output at lines 22 are three analog signals corresponding to the red, green and blue signals required by a color CRT monitor. Though not shown in FIG. 4, the rate at which data is read from the on-screen buffer 38 is compatible with the refresh rate needs of the particular CRT monitor.

The direct-color mode pixel stream on the line 130 is received by the color encoder 114, previously described as corresponding to the bandwidth reduction circuit 52 of FIG. 2. The color encoder 114 is programmable to convert the direct-color mode pixel stream of 24-bit color pixels on the line 130 into, alternatively, a 16-bit direct-color mode pixel stream or an 8-bit direct-color mode pixel stream. In both cases there is a reduction in the bandwidth of the resulting pixel stream. The output of the color encoder 114 passes via the line 132 and the multiplexer 116 to the write FIFO 118 which is programmed to write the reduced bandwidth pixel stream into the off-screen buffer 50 of the external display memory 16.

The reduced bandwidth pixel data in the off-screen buffer 50 is now available for access and display by the second display processor 42 as described above with respect to FIG. 2. The reduced bandwidth data is read from the off-screen buffer 50 via the read FIFO 120 and is received as an 8- or 16-bit per pixel direct-color mode pixel stream by the LCD processor 124. The LCD processor 124 adjusts the reduced bandwidth pixel steam for compatibility with the TFT display of this example and outputs the pixel stream on output lines 18 for display by the TFT device. The rate at which the reduced bandwidth data is read from the off-screen buffer 50 is compatible with the refresh rate needs of the particular TFT device and is independent of the rate at which the data for the color CRT monitor is read from the on-screen buffer 38. By way of example, the CRT is refreshed at a rate of 30 frames per second, while the TFT display is refreshed at a rate of 60 frames per second. It is this possibility of having these two display processes, each operating independently at its own refresh rate, determined solely by the needs of a connected display device, that gives rise to the phrase Virtual Refresh™ architecture.

EXAMPLE 2

Indexed-color Mode to CRT Monitor and to DSTN LCD

The simultaneous display processes for this example make use of many of the parts discussed in the first example up to the point at which a reduced bandwidth copy of the on-screen buffer data has been written into the off-screen buffer 50. That previous discussion will not be repeated here.

Figure 5:
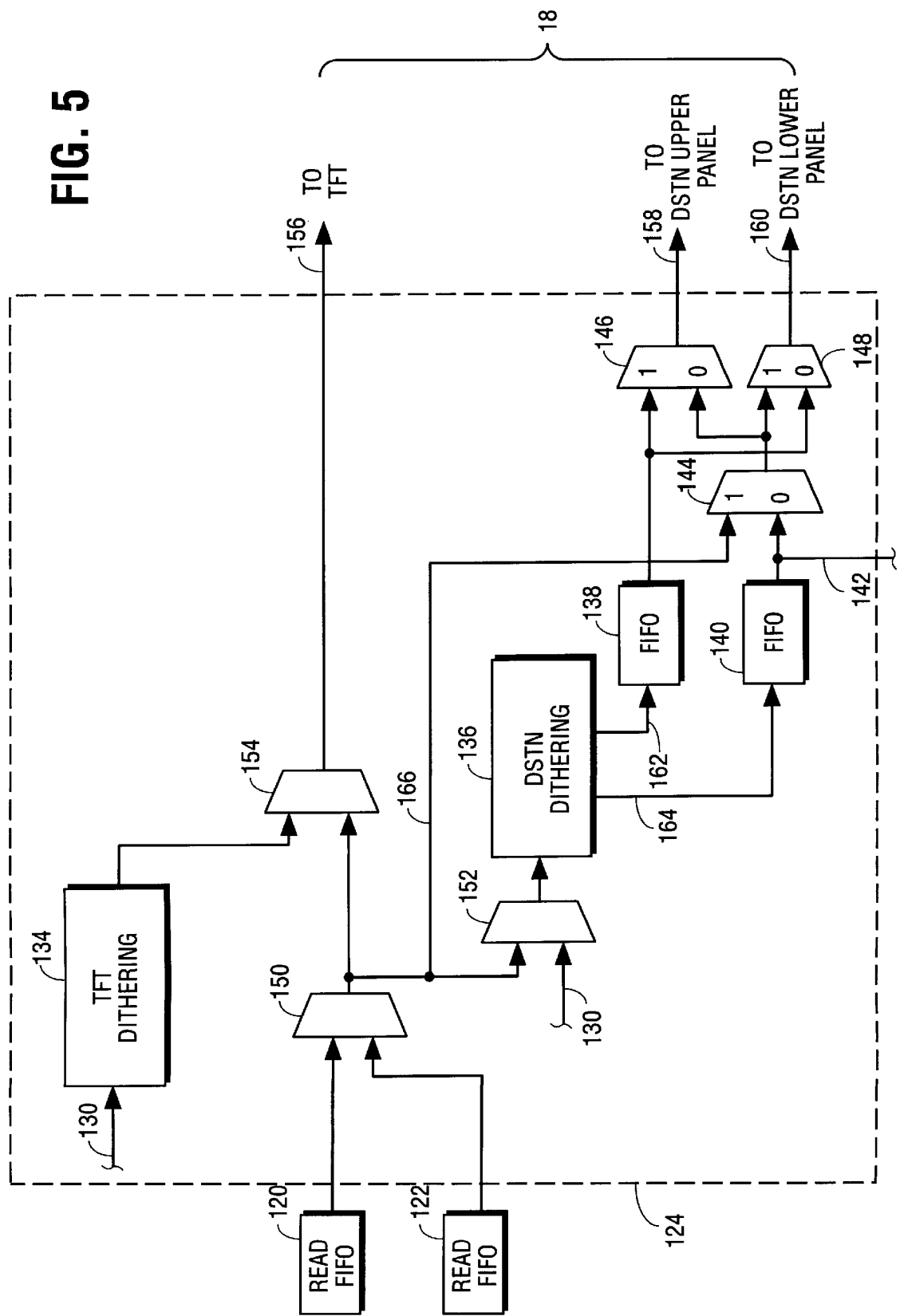
FIG. 5 is a block diagram showing a specific embodiment of an LCD processor portion of the single-chip video-graphics controller shown in FIG. 4.

A specific embodiment of the LCD processor 124 of FIG. 4 is illustrated in the block diagram shown in FIG. 5. Parts contained within the LCD processor 124 are shown enclosed in a broken line in FIG. 5. These parts include a TFT dithering engine 134, a DSTN dithering engine 136, first and second DSTN dithering FIFO's 138, 140, an output line carrying a predicted-next-frame pixel stream 142, and multiplexers 144, 146 and 148 forming an upper/lower panel switch for a DSTN display. FIG. 5 includes the two read FIFO's 120, 122 shown in FIG. 4, and the output lines 18 of FIGS. 1 and 4 are shown including output lines 156 for driving a TFT display, output lines 158 for driving the upper panel of a DSTN display, and output lines 160 for driving the lower panel of a DSTN display. FIG. 5 includes multiplexers 150, 152 and 154, and the LCD processor 124 receives an input on line 130 carrying the direct-color mode 24-bit pixel stream. In a specific embodiment, the DSTN dithering FIFO's are each 8 bits wide by 6 deep.

The Virtual Refresh™ architecture permits an innovative solution to the DSTN dithering problem, relying upon the fact that each read FIFO and each write FIFO includes a start address register and an offset register (see FIG. 3) permitting the data to be written into and read from any block of storage locations within the external display memory 16.

A DSTN display device includes two halves, an upper panel and a lower panel. Display data is written to both panels simultaneously, a line at a time. For example, in a 640×480 pixel color DSTN display device, line 1 of the upper panel is written simultaneously with line 241, which is the first line of the lower panel. Then lines 2 and 242 are written. Then lines 3 and 243, etc., continuing through lines 240 and 480, respectively.

Dithering is used to enhance the color depth of the DSTN displayed image. Dithering is a time modulation process in which the image is repeatedly displayed at a very high rate to create an added brightness dimension, resulting in greater color depth than is possible by direct control of the individual pixels. A dithering engine examines a pixel read from the external display memory 16 and determines how often the pixel should be re-displayed at the high dithering rate.

In a specific embodiment of the present invention, as illustrated in FIG. 5, the direct-color mode 24-bit pixel stream on line 130 is received by the LCD processor 124, passes through the multiplexer 152 and enters the DSTN dithering engine 136. Two outputs are created by the DSTN dithering engine 136, a current-frame pixel stream on line 162 is delayed through the first DSTN dithering FIFO 138, while a predicted-next-frame pixel stream on line 164 is delayed through the second DSTN dithering FIFO 140 producing the delayed predicted-next-frame pixel stream on line 142 (also shown on FIG. 4).

As shown on FIG. 4, the delayed predicted-next-frame pixel stream on line 142 passes through the multiplexer 116 and over-writes one half of a frame previously stored in the off-screen buffer 50. One of the read FIFO's 120, 122 is programmed to read a previously stored delayed predicted-next-frame pixel stream, which passes through the multiplexer 150, along the line 166 to the multiplexer 144, then is selected through the pair of multiplexers 146, 148 and sent to the upper (lower) DSTN panel. Simultaneously, the current-frame pixel stream delayed by the first DSTN dithering FIFO 138 is selected by the pair of multiplexers 146, 148 and sent to the lower (upper) DSTN panel. Simultaneously, the delayed predicted-next-frame pixel stream on line 142 is being written by the write FIFO 118 whose start address and offset register have been programmed to overwrite the half of the frame in the off-screen buffer 50 that is currently being read by the read FIFO 120, 122. The overwriting is just behind the reading so that no information is lost. When the process reaches the end of the current frame, the offset registers of the read FIFO 120 and the write FIFO 118 are swapped and the multiplexers 146, 148 are switched so that the opposite DSTN panels receive current and previously written predicted-next-frame pixel streams.

EXAMPLE 3

Direct-Color Mode to CRT Monitor and TFT Display

Figure 6:
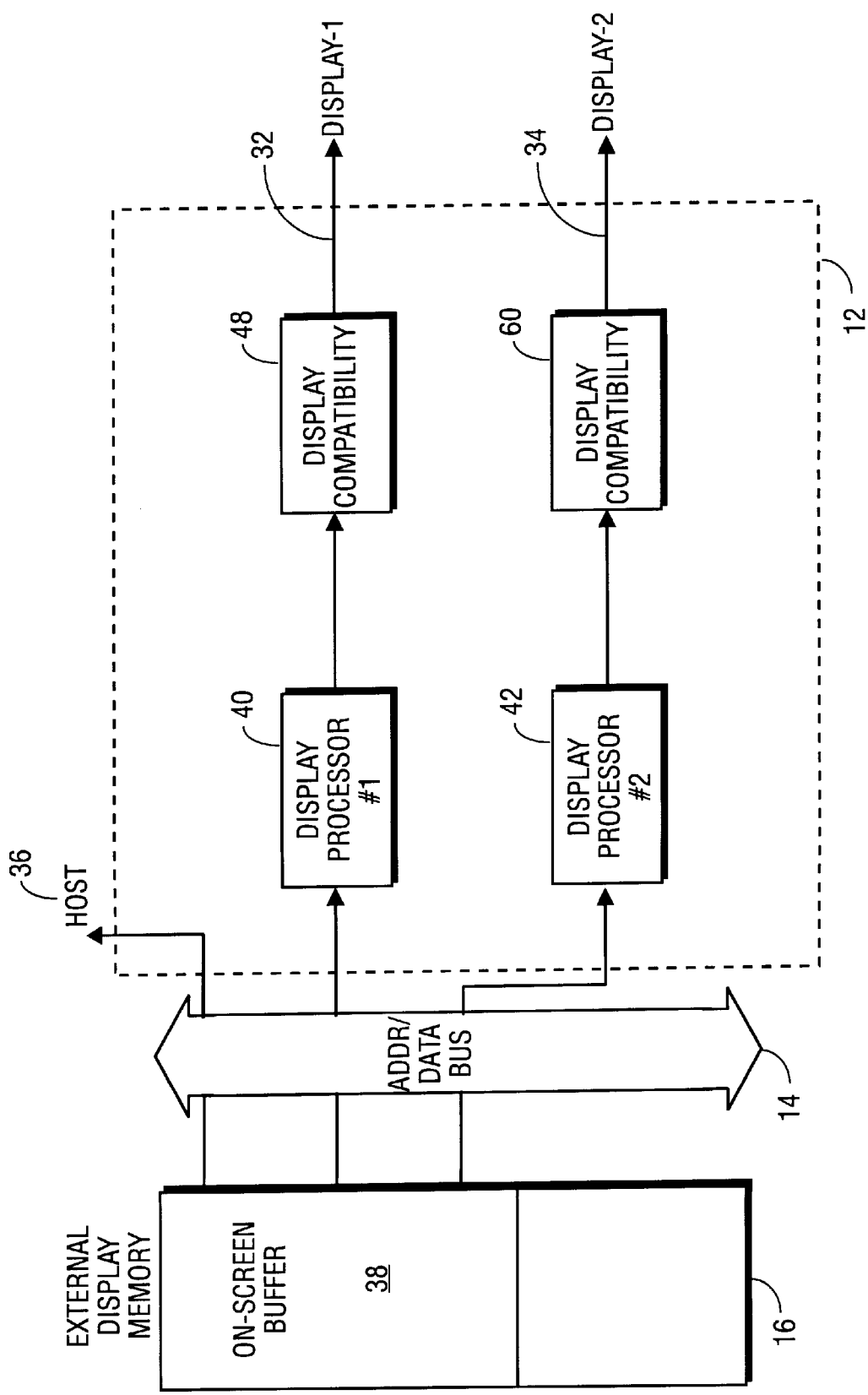
FIG. 6 is a block diagram illustrating a specific programmed configuration of the video-graphics controller of FIG. 2.

FIG. 6 is a block diagram which illustrates the display configuration for the video-graphics controller 12 for displaying direct-color mode image data simultaneously to a color CRT monitor and to a TFT LCD display. FIG. 6 shows the external display memory 16, having an on-screen buffer 38, accessible by the host 36 via the shared address and data bus 14. The bus 14 is also shared in this example by a first display process carried out by the first display processor 40 and associated first display compatibility circuit 48, and by a second display process carried out by the second display processor 42 and its associated display compatibility circuit 60. The output signals to the CRT monitor are available at lines 32, while the output signals to the TFT display are available at lines 34.

In this example we assume the host 36 is periodically updating an image in the on-screen buffer 38 and that the color pixels making up that image are coded in a 24-bit direct-color mode (i.e., 8 bits Red, 8 bits Green and 8 bits Blue). The operation of the first and second display processors 40, 42 for this example is best understood with reference to the block diagrams in FIGS. 4 and 5.

The read FIFO 94 (FIG. 4) is programmed to fetch the direct-color mode data from the on-screen buffer 38. The fetched color pixel stream passes through the multiplexer 106, then through the multiplexer 104 and onto line 130. The color pixel stream on line 130 enters the digital-to-analog converters 110 for output to the CRT monitor on lines 22.

In this example using 24-bit color pixels, the video-graphics controller 12 is programmed to use the read FIFO 120 (alternatively, the read FIFO 122) to fetch the color pixel stream directly from the on-screen buffer 38, as shown in FIG. 6. The fetched color pixel stream passes through the multiplexer 150 and the multiplexer 154 and is sent directly to the TFT display device on lines 156.

In a variation of this example, we assume that the color image updated by the host 36 in the on-screen buffer 38 is coded in one of the direct-color modes using 8 or 9 bits total to encode all three colors (e.g., 3:2:3 or 3:2:4). In this variation, the video-graphics controller 12 is programmed to receive the color pixel stream on line 130. The color pixel stream enters the TFT dithering engine 134 (FIG. 5) and the color depth enhanced output of the dithering engine 134 passes through the multiplexer 154 to lines 156 and to the TFT display panel.

The Virtual Refresh™ architecture illustrated in FIG. 6 also permits different images to be displayed simultaneously. The two images are stored in different parts of the external display memory 16. One image is fetched by the first display processor 40 and displayed on a first display device, while the other image is fetched by the second display processor 42 and displayed on a second display device. This feature is useful during presentations, permitting the presentation information to be displayed to an audience while a speaker's notes are being displayed on a flat-panel display.

EXAMPLE 4

Indexed-Color Mode to Interlaced TV and TFT Display

Most television receivers and projectors operate in either the NTSC (US standard) or the PAL (European standard) and use interlaced scanning in which the odd numbered display lines are displayed during one frame and the even numbered display lines are displayed during an alternate frame. The two frames are superimposed on the TV display at twice the display frame rate and the human eye sees a single picture. The need to handle interlaced data adds significantly to the complications faced by most display controllers. The Virtual Refresh™ architecture, however, renders the interlaced display problem trivial.

The interlaced mode of operation for the first display processor 40 can be understood with reference to FIG. 4. When the data in the on-screen buffer 38 is in an indexed-color mode, the data is accessed using the read FIFO 90 and is converted by the color-palette RAM 100 to a direct-color mode. The direct-color mode data is converted by the digital-to-analog converters 112 to separate RGB analog output signals for the TV. When the data in the on-screen buffer 38 is in a direct-color mode, the data is accessed via the read FIFO 94, passes through the multiplexers 106, 104 and 108 to the digital-to-analog converters 112, and bypasses the color-palette RAM 100.

To handle the interlaced requirements of the display device, the read FIFO 90 (or 94 when direct-color mode data is in the on-screen buffer 38) is programmed to fetch every other line during one frame, then offset by one and programmed to fetch the intermediate lines during the next frame.

When a copy of the image is needed in the off-screen buffer 50 for use by the LCD processor 124, the multiplexer 104 selects either the output of the color-palette RAM 100 or the output of the multiplexer 106 to provide a stream of direct-color mode data pixels on line 130 to the LCD processor 124. When the data in the on-screen buffer 38 is in an indexed-color mode, the pixel stream from the color-palette RAM 100 is selected. When the data in the on-screen buffer 38 is in a direct-color mode, the pixel stream from the multiplexer 106 is selected.

Auto-Centering Feature

Figure 7:
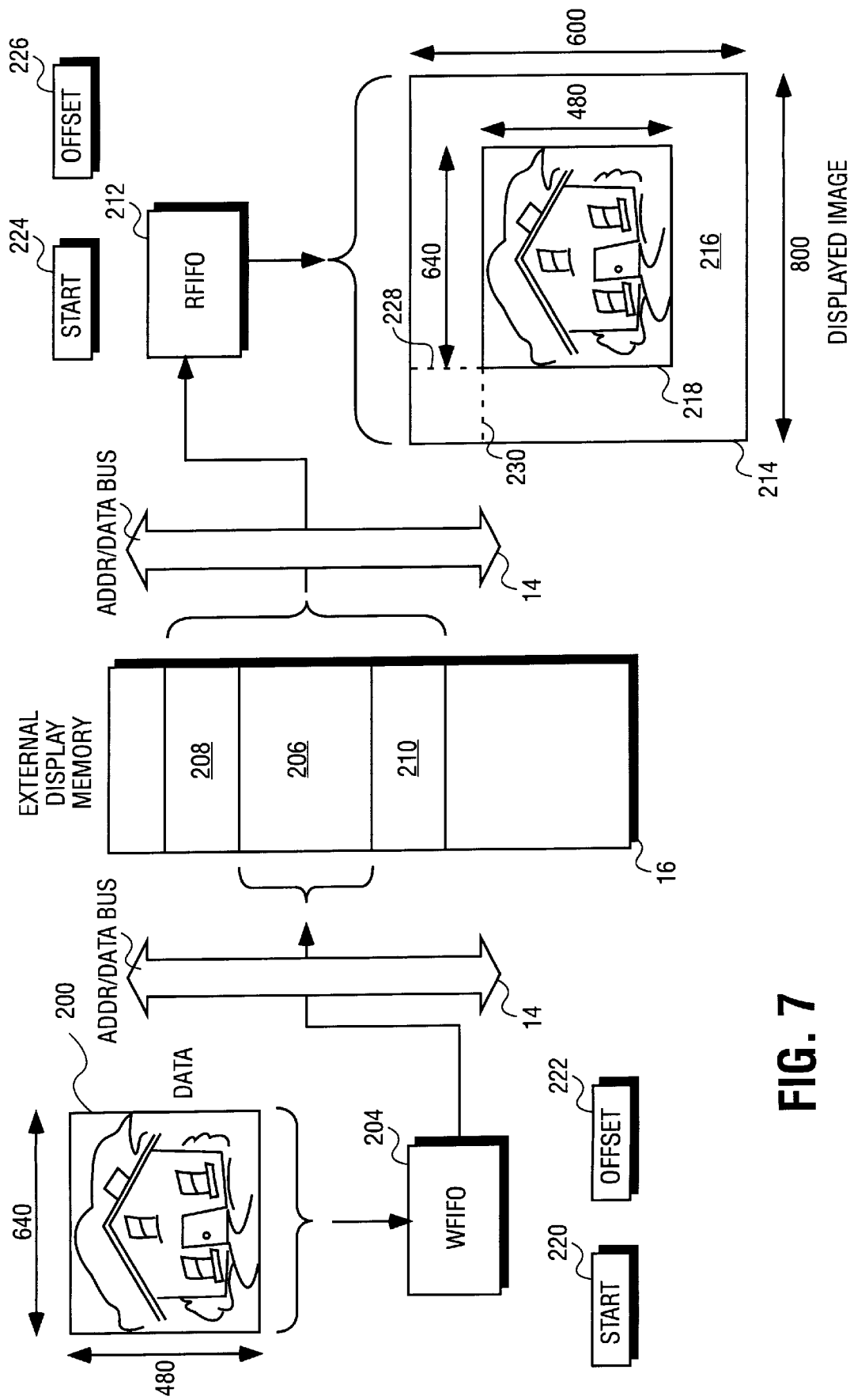
FIG. 7 is a pictorial-schematic diagram illustrating data flow with respect to an auto-centering feature of the single-chip video-graphics controller shown in FIG. 2.

FIG. 7 is a pictorial-schematic diagram illustrating an example of information flow through the video-graphics controller 12 according to another aspect of the present invention. The figure shows a color pixel image 200, a write FIFO 204, having a start address register 220 and an offset register 222, the address and data bus 14, the external display memory 16 including storage regions 206, 208 and 210, a read FIFO 212, having a start address register 224 and an offset register 226, a displayed image 214 including a border 216 and the original image 218, a vertical displacement 228, and a horizontal displacement 230.

The purpose of FIG. 7 is to illustrate an auto-centering feature of the present invention. The operation of this feature will become clear as this description proceeds. In the example illustrated in FIG. 7, the host 36 (not shown) places an original color pixel image 200 into the external display memory 16 for ultimate display on a display device. In this example, the original image is 640×480 color pixels. The host 36 uses the write FIFO 204 to write the original image 200 into the region 206 of the external display memory 16. A display processor (e.g., the display processor 40 of FIG. 6) uses the read FIFO 212 to fetch the contents of the regions 208, 206, 210 from the external display memory 16, do any necessary processing, make any necessary compatibility changes, and send a composite image 214 to the display device. In this example, the display device is assumed to display images of size 800×600 color pixels.

The displayed image 214 includes the original 640×480 pixel image 200 centered within the larger 800×600 pixel field 214. The centered image 218 is surrounded by a border 216. The border can be programmed by the host 36 to be anything it wants, for example any solid color, or blank, or a "wallpaper" pattern.

The auto-centering feature which produces the displayed image 214 is achieved by appropriate use of the Virtual Refresh™ resources described with respect to FIGS. 2, 3, 4 and 5, above. The location of the upper left-hand corner of the centered image 218 with respect to the upper left-hand corner of the composite displayed image 214 is controlled by determining a vertical displacement 228 and a horizontal displacement 230 expressed as a pixel count. Then the write FIFO 204 start address register 220 and offset register 222 are loaded with the proper numbers to delay the start of the memory region 206 so that the desired relationship between the upper left-hand corners is maintained. The host 36 loads the regions 208 and 210 with the desired border 216 background (i.e., blank, solid color, wallpaper, etc.) and then writes the image 200 to be displayed into the memory region 206.

The display processor (e.g., 40 of FIG. 6) always fetches all the color pixel information in the composite regions 208, 206, 210 for display on the 800×600 pixel format.

While the invention has been described in relation to the embodiments shown in the accompanying Drawing figures, other embodiments, alternatives and modifications will be apparent to those skilled in the art. It is intended that the Specification be only exemplary, and that the true scope and spirit of the invention be indicated by the following claims.

What is claimed is:

1. A single-chip video-graphics controller for displaying a color image stored in an external display memory simultaneously on two display devices having different refresh requirements, the controller comprising:

a first display processor coupled to the external display memory to fetch the color image from the external display memory and output the image as a fetched color image at a first rate compatible with the refresh requirements of a first display device;

a bandwidth reduction circuit coupled to the first display processor and the external display memory, the bandwidth reduction circuit to reduce a bandwidth of the fetched color image to yield a reduced bandwidth image, the bandwidth reduction circuit to store a copy of the reduced bandwidth image in the external display memory; and a second display processor coupled to the external display memory to fetch the reduced bandwidth image from the external display memory and output the reduced bandwidth image at a second rate compatible with the refresh requirements of a second display device, the first display processor and the second display processor being independent of each other.

2. The single-chip video-graphics controller as set forth in claim 1, further comprising a clock circuit to alternatively slow or stop clock signals used to operate the first display processor and the bandwidth reduction circuit, the clock control circuit responsive to programmable selection and to an unchanging color image.

3. The single-chip video-graphics controller as set forth in claim 1, wherein the external display memory is partitioned into an on-screen buffer and an off-screen buffer, and wherein the color image is updated in the on-screen buffer by a host device, and the reduced bandwidth color image is stored in the off-screen buffer.

4. The single-chip video-graphics controller as set forth in claim 3, wherein the updated color image is encoded in an indexed-color mode.

5. The single-chip video-graphics controller as set forth in claim 3, wherein the updated color image is encoded in a direct-color mode.

6. The single-chip video-graphics controller as set forth in claim 1, wherein the first display device is a color CRT monitor.

7. The single-chip video-graphics controller as set forth in claim 6, wherein the color CRT monitor operates in an interlaced mode.

8. The single-chip video-graphics controller as set forth in claim 1, wherein the first display device is a color television receiver/projector.

9. The single-chip video-graphics controller as set forth in claim 8, wherein the color television receiver operates according to one of the NTSC standard and the PAL standard.

10. The single-chip video-graphics controller as set forth in claim 1, wherein the second display device is a color flat-panel display.

11. The single-chip video-graphics controller as set forth in claim 10, wherein the flat-panel display is a color TFT display.

12. The single-chip video-graphics controller as set forth in claim 10, wherein the flat-panel display is a color DSTN display, and wherein the second display processor includes a DSTN dithering circuit for enhancing the color depth of the displayed image.

13. The single-chip video-graphics controller as set forth in claim 1, wherein the first display processor includes a first read FIFO for accessing the external display memory, and wherein the first read FIFO includes a start address register and an offset register permitting the first display processor to access any block of storage locations in the external display memory.

14. The single-chip video-graphics controller as set forth in claim 1, wherein the second display processor includes a second read FIFO for accessing the external display memory, and wherein the second read FIFO includes a start address register and an offset register permitting the second display processor to access any block of storage locations in the external display memory.

15. The single-chip video-graphics controller as set forth in claim 1, wherein the bandwidth reducing circuit includes a write FIFO for storing the reduced bandwidth image into the external display memory, and the write FIFO includes a start address register and an offset register permitting the reduced bandwidth image to be stored in any block of storage locations in the external display memory.

16. The single-chip video-graphics controller as set forth in claim 4, wherein the first display processor includes a color-palette RAM for converting the indexed-color mode image into a direct-color mode image for output to the first display device.

17. The single-chip video-graphics controller as set forth in claim 1, wherein the bandwidth reduction circuit reduces the bandwidth of the fetched color image on-the-fly.

18. The single-chip video-graphics controller as set forth in claim 1, further comprising a clock control circuit to slow a clock signal based on an event signal, the clock signal used to operate the first display processor and the bandwidth reduction circuit, the clock control circuit responsive to programmable selection and to an unchanging color image.

19. The single-chip video-graphics controller as set forth in claim 18, further comprising an activity detector to transmit the event signal to the clock control circuit within a predetermined interval.

20. The single-chip video-graphics controller as set forth in claim 19, wherein the predetermined interval is a time period when the external display memory is not accessed by a host.

21. A display system having an external display memory and an address and data bus for accessing the memory, the system comprising:
 a first display processor to fetch color data pixels from an on-screen buffer located in the external display memory, the first display processor to gamma correct the color data pixels to yield a plurality of gamma corrected color data pixels having a bandwidth, the first display processor to convert the gamma corrected color data pixels to analog RGB output signals compatible with display and refresh needs of a first display device;
 a bandwidth reduction color encoder to receive and reduce the bandwidth of the gamma corrected color data pixels to yield a plurality of encoded color data pixels, the bandwidth reduction color encoder to cache the encoded color data pixels in an off-screen buffer located in the external display memory;
 a second display processor to fetch the encoded color data pixels from the off-screen buffer and converting the encoded color data pixels to digital display output signals compatible with the display and refresh needs of a second display device, the first and the second display processors implemented in a single chip independent of each other.

22. The display system as set forth in claim 17, wherein the first display device is an interlaced color television projector, and the second display device is a color LCD display.

23. The display system as set forth in claim 17, wherein one image is displayed on the first display device and a different image is displayed concurrently on the second display device, whereby a presentation can be made on the first display device while a speaker's notes are displayed on the second display device.

24. The display system as set forth in claim 17, wherein the gamma correction converts the stream of color data pixels from an indexed-color mode to a 24-bit direct-color mode and the color encoder is programmable to convert the 24-bit direct-color mode data pixels to one of 16-bit direct-color mode data pixels and 8-bit direct-color mode data pixels, thereby reducing the bandwidth of the gamma corrected color data pixels.

25. The display system as set forth in claim 17, further comprising a bus to connect the external memory, the first display processor and the second display processor with each other, the bus having sufficient bandwidth to permit the first display processor to output the fetched color image at a rate compatible with an interlaced display device and the second display processor to output the reduced bandwidth image at a rate compatible with a fully dithered flat panel display device.

* * * * *